United States Patent
Ketter, Jr.

(10) Patent No.: US 8,307,759 B2
(45) Date of Patent: Nov. 13, 2012

(54) EXTENDING FILTER BASKET

(75) Inventor: Charles Ketter, Jr., Greenwood, AR (US)

(73) Assignee: Green Planet Solutions, LLC, Highlandville, MO (US)

( * ) Notice: Subject to any disclaimer, the term of this patent is extended or adjusted under 35 U.S.C. 154(b) by 498 days.

(21) Appl. No.: 12/467,514

(22) Filed: May 18, 2009

(65) Prior Publication Data

US 2009/0288564 A1    Nov. 26, 2009

Related U.S. Application Data

(60) Provisional application No. 61/055,495, filed on May 23, 2008.

(51) Int. Cl.
*A47J 37/12* (2006.01)
*A23L 1/00* (2006.01)

(52) U.S. Cl. ............... 99/407; 99/410; 99/413; 99/450; 220/62.1; 210/455; 210/477

(58) Field of Classification Search .................... 99/407, 99/408, 450, 413, 410; 210/305, 455, 470, 210/477; 220/62.1
See application file for complete search history.

(56) References Cited

U.S. PATENT DOCUMENTS

| | | | |
|---|---|---|---|
| 472,002 A * | 3/1892 | Ross et al. ...................... 99/340 |
| 625,586 A * | 5/1899 | Morgan ......................... 99/413 |
| 3,933,645 A | 1/1976 | Keramidas |
| 5,342,513 A * | 8/1994 | Wall et al. ..................... 210/238 |
| 5,595,107 A | 1/1997 | Bivens |
| 5,782,164 A * | 7/1998 | Brintle ........................... 99/330 |
| 6,176,175 B1 * | 1/2001 | Moreth .......................... 99/408 |
| 6,364,120 B1 | 4/2002 | Sanchez et al. |
| 6,568,314 B1 * | 5/2003 | Stepanova ..................... 99/340 |
| 6,732,636 B1 * | 5/2004 | Germano ........................ 99/411 |
| 7,500,427 B2 * | 3/2009 | Rosenzweig ................... 99/407 |

* cited by examiner

*Primary Examiner* — Reginald L Alexander
(74) *Attorney, Agent, or Firm* — Conley Rose, P.C.; Grant Rodolph; Brandt Howell

(57) ABSTRACT

The present invention is a fryer basket or roaster basket constructed with fine wire mesh to prevent food particles from remaining in the fryer oil once the fried food is removed. The fryer basket is preferably constructed of stainless steel, but other materials could be used including but not limited to copper, brass, glass, fiberglass or the like.

8 Claims, 5 Drawing Sheets

EXTENDING FILTER BASKET

CROSS REFERENCE TO RELATED APPLICATION

This patent application is related to and claims priority from U.S. Provisional Patent Application Ser. No. 61/055,495 filed May 23, 2008.

FIELD OF THE INVENTION

This invention generally pertains to deep fryer baskets. More specifically, the present invention relates to a fryer basket with a fine mesh filter.

BACKGROUND OF THE INVENTION

The invention is particularly applicable to fry baskets and will be described with particular reference thereto. However, it will be appreciated by those skilled in the art that the invention has broader applications and may also be adapted for use as deep fryer trap, deep fryer filter, deep fryer basket, and the like.

Restaurants that serve fried food use a great deal of cooking oil. When food particles are not filtered and make their way into the oil, they cause the oil to break down more quickly. This affects the taste of the fried food and greatly shortens the useable lifespan of the cooking oil.

Typically fry baskets are constructed of thick wire with wide gapes formed between the wires. This arrangement allows food particles to remain in the fryer through many fry cycles, thus reducing the quality and useable lifespan of the oil. By removing the food particles more frequently, preferably ever frying cycle, the oil is maintained at a higher quality for a longer period of time. Efforts to maintain cooking oil quality for longer periods of time have yielded less than ideal solutions.

Many potential solutions focus on filtering the oil after the fryer is done being used. That is the entire fryer must be drained and filtered. Which requires the fryer to be shut down and allowed to cool, that is if safe methods are being practiced. This method is time consuming, not energy efficient, and by consequence expensive. Many potential solutions simply focus on speeding up this method by constructing built in filters for fryers or suction filters that more quickly filter the oil.

Other potential solutions focus on catching the food particles earlier in the fryer. Some of these take the form of fryer liners that set in the flyer like a large fry basket made of wire mesh. To be effective these liners need to emptied frequently. So in practice the user needs to remove a fry basket filled with fried food items, and then remove the liner and dump its contents. This is an added step that takes time, thus making the frying process less efficient. Alternatively, if the fryer liner is not removed every fry cycle, then the oil preservation benefits are diminished.

Yet another potential solution is the inserting of metal mesh liners into traditional fry baskets. While this solves some of the short comings of the previously mentioned solutions, it also creates several new problems. Among the problems is that the fry liners can fall out of the traditional basket if not properly secured. Also, food particles can become lodged between the mesh and the wire basket, thus diminishing the effectiveness of the liners.

Accordingly, it has been considered desirable to develop a new and improved fry basket which would overcome the foregoing difficulties and others while providing better and more advantageous overall results.

SUMMARY OF THE INVENTION

The present invention is a fryer basket or roaster basket constructed with fine wire mesh to prevent food particles from remaining in the fryer oil once the fried food is removed. The fryer basket is preferably constructed of stainless steel, but other materials could be used including but not limited to copper, brass, glass, fiberglass or the like.

The basket preferably includes a basket bottom wall; a basket front wall; a basket rear wall; and two basket side walls, where the basket front wall, basket rear wall and two basket side walls have upper edges defining in combination a basket rim. Alternatively, the basket could be cylindrical in shape with a circular mesh bottom and side wall extending upward to create a basket rim.

The fry basket preferably additionally includes at least one detachable handle. Two handles may be preferred for larger variations of the fry basket.

OBJECTS OF THE INVENTION

It is, therefore, one of the primary objects of the present invention to provide a fryer basket that prevents food particles from remaining in fryer oil between frying cycles.

Another object of the present invention is to provide a fryer basket that aids in maintaining the quality of fryer oil being used in a fryer.

Still another object of the present invention is to provide a fryer basket with at least one detachable handle.

In one embodiment the invention is a basket for frying food products comprising: a wire mesh base, at least one wire mesh side wall, wherein said at least one side wall forms an upper rim of said basket. In other embodiment the basket is constructed with a wire mesh with distances of 0.0010 to 0.0450 inches between adjacent parallel wires of said wire mesh. In yet another embodiment the basket is constructed with a wire mesh with distances of 0.0060 to 0.0350 inches between adjacent parallel wires of said wire mesh. In still another embodiment the basket is constructed with a wire mesh with distances of 0.0060 to 0.0150 inches between adjacent parallel wires of said wire mesh.

In another embodiment the present invention is a basket for frying food products comprising: a substantially rigid metal frame, a wire mesh base attached to said substantially rigid metal frame, at least one wire mesh side wall attached to said substantially rigid metal frame, a detachable handle, wherein the basket is constructed with a wire mesh with distances of 0.0010 to 0.0450 inches between adjacent parallel wires of said wire mesh. In yet another embodiment the basket is constructed with wire mesh with distances of 0.0060 to 0.0350 inches between adjacent parallel wires of said wire mesh. In yet another embodiment the basket is constructed with wire mesh with distances of 0.0060 to 0.0150 inches between adjacent parallel wires of said wire mesh.

In another embodiment the invention is a basket for frying food products comprising: an outer frame, an inner frame, at least one piece of wire mesh, wherein said at least one piece of wire mesh is sandwiched between said outer frame and said inner frame to form a substantially rectangular basket having a wire mesh base and at least one wire mesh sidewall. In yet another embodiment the basket is constructed with wire mesh with distances of 0.0010 to 0.0450 inches between adjacent parallel wires of said wire mesh. In still another embodiment the basket is constructed with wire mesh with distances of 0.0060 to 0.0350 inches between adjacent parallel wires of said wire mesh. In yet still another embodiment the basket is constructed with wire mesh with distances of 0.0060 to 0.0150 inches between adjacent parallel wires of said wire mesh. In still yet another embodiment the basket comprises at least one handle. In still another embodiment the basket is constructed of stainless steel. In yet another embodiment the basket is constructed of copper. In still another embodiment the basket comprises at least one detachable handle. In yet another embodiment said at least one piece of wire mesh is removable. In another embodiment said at least one piece of wire mesh is replaceable.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention; and together with the description serve to explain the principles and operation of the invention.

Figure 1:
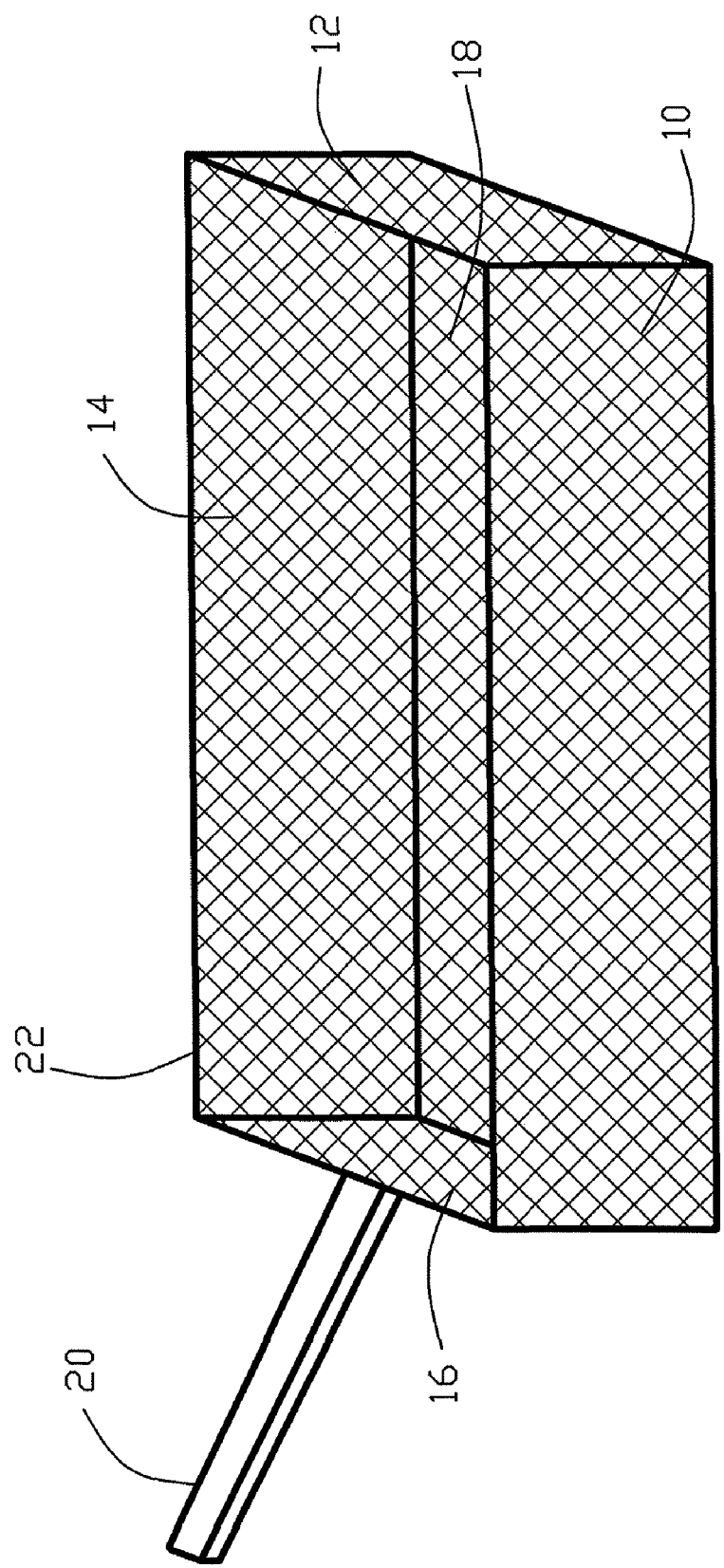
FIG. 1 is a general perspective view of one embodiment of the present invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIG. 1 which is a general perspective view of one embodiment of the present invention. The generally rectangular fry basket comprises a metal frame 22 with longitudinal mesh side walls 10 and 14; latitudinal mesh side walls 12 and 16; mesh base 18 and handle 20. Metal frame 22 is preferably constructed of substantially rigid stainless steel. The members of frame 22 could be in the form of thick wire, sheet metal, solid bars, hollow bars, hollow tubes or the like. Handle 20 is preferably detachable from the fry basket.

Figure 2:
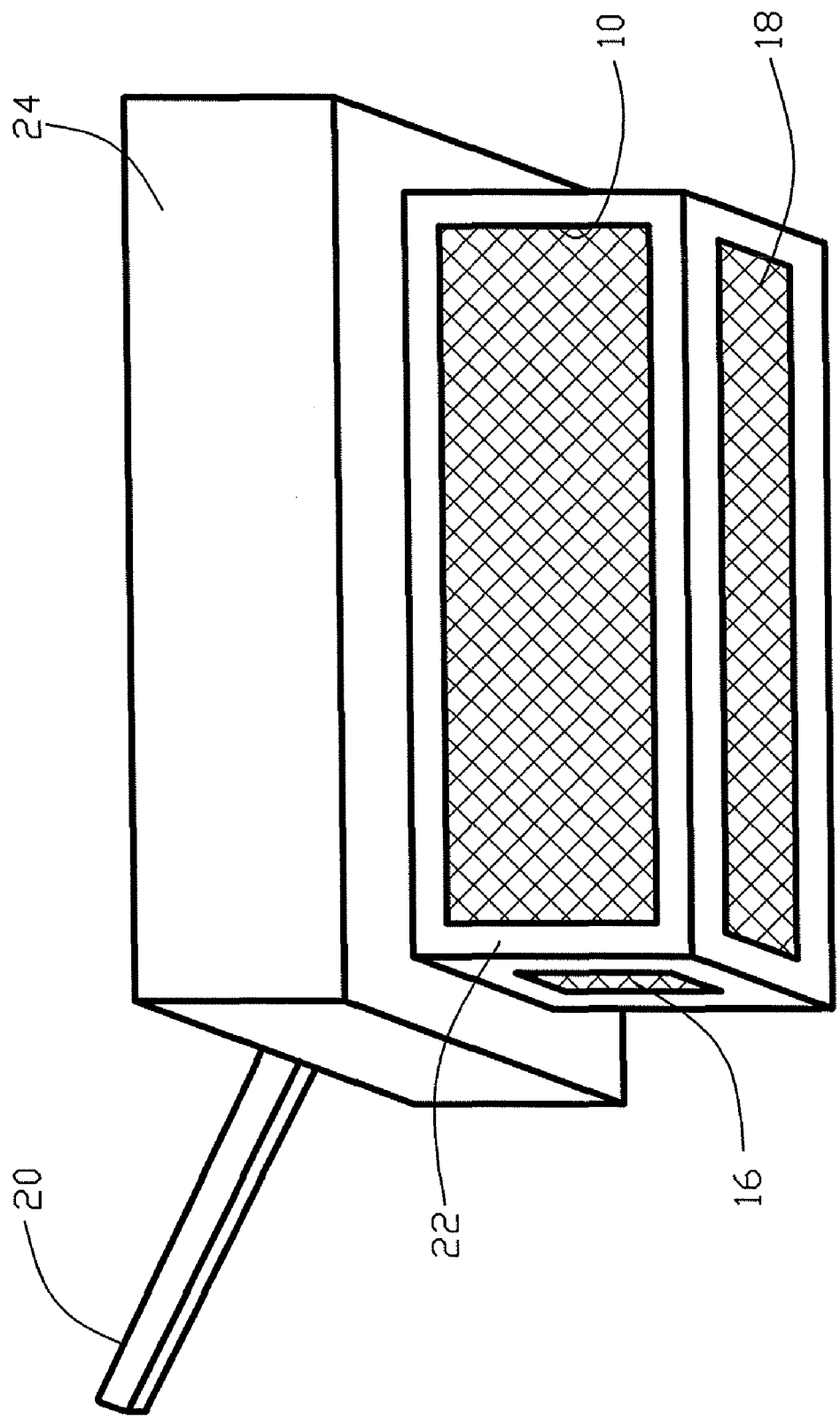
FIG. 2 is a general perspective view of another embodiment of the present invention.

Reference is now made to FIG. 2 which is a general perspective view of another embodiment of the present invention. The generally rectangular fry basket comprises an upper metal frame 24, a lower metal frame 22 with lower longitudinal mesh side walls 10 and 14 (not shown); lower latitudinal mesh side walls 12 (not shown) and 16; mesh base 18 and handle 20. Metal frame 22 is preferably constructed of substantially rigid stainless steel. The members of frame 22 could be in the form of thick wire, sheet metal, solid bars, hollow bars, hollow tubes or the like. Handle 20 is preferably detachable from the fry basket. Upper metal frame is preferably constructed of stainless steel sheet metal.

Figure 3:
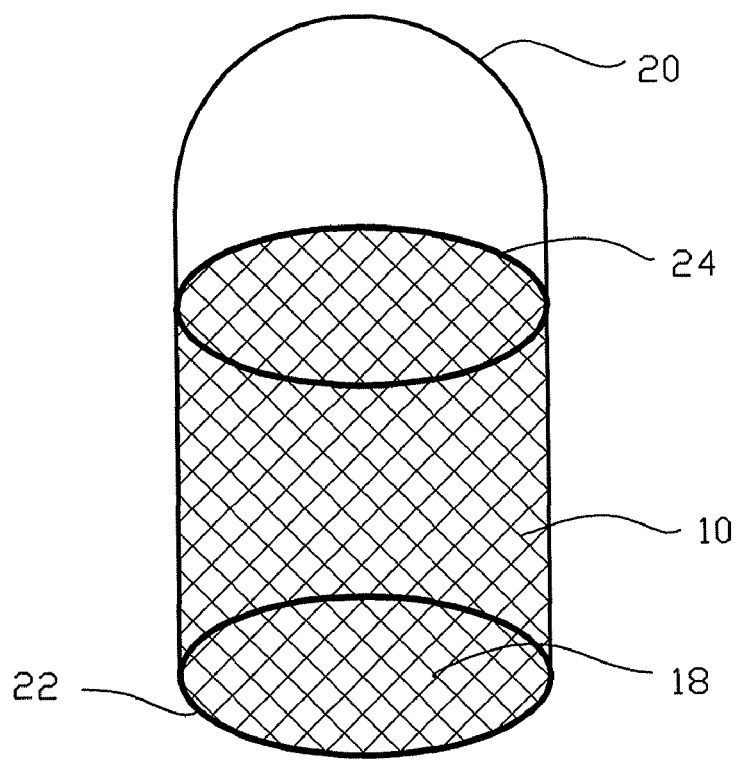
FIG. 3 is a general perspective view of yet another embodiment of the present invention.

Reference is now made to FIG. 3 which is a general perspective view of one embodiment of the present invention. The generally cylindrical fryer basket comprises an upper metal rim 24, a lower metal rim 22, fine wire mesh base 18, fine mesh sidewall 10 and handle 20.

Figure 4:
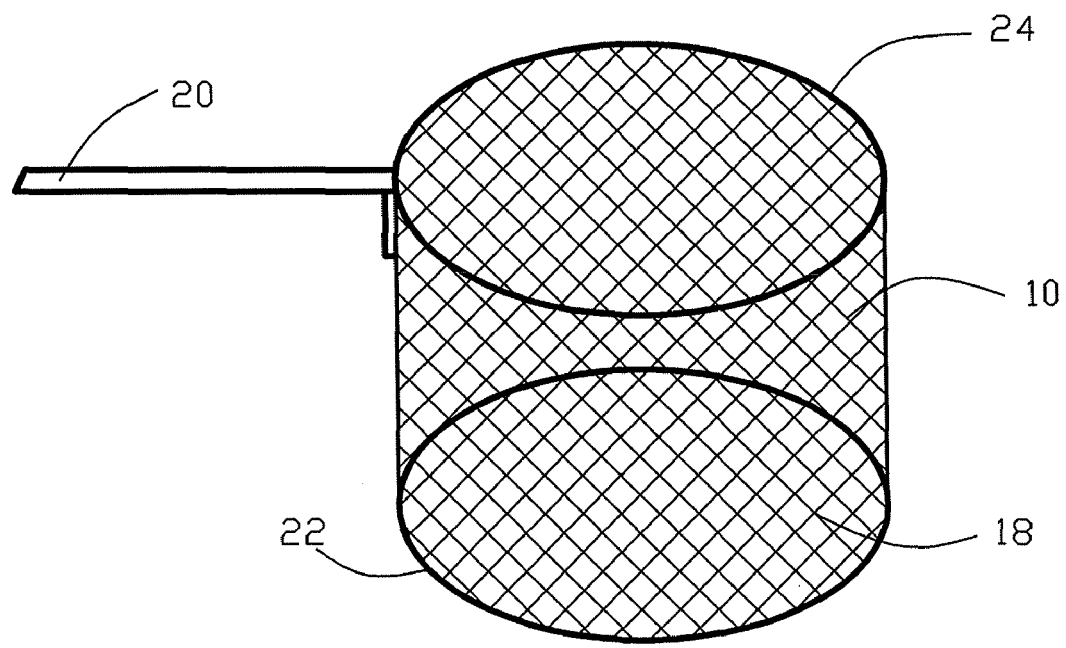
FIG. 4 is a general perspective view of still yet another embodiment of the present invention.

Reference is now made to FIG. 4 which is a general perspective view of one embodiment of the present invention. The generally cylindrical fryer basket comprises an upper metal rim 24, a lower metal rim 22, fine wire mesh base 18, fine mesh sidewall 10 and handle 20. Preferably handle 20 is detachable.

Figure 5:
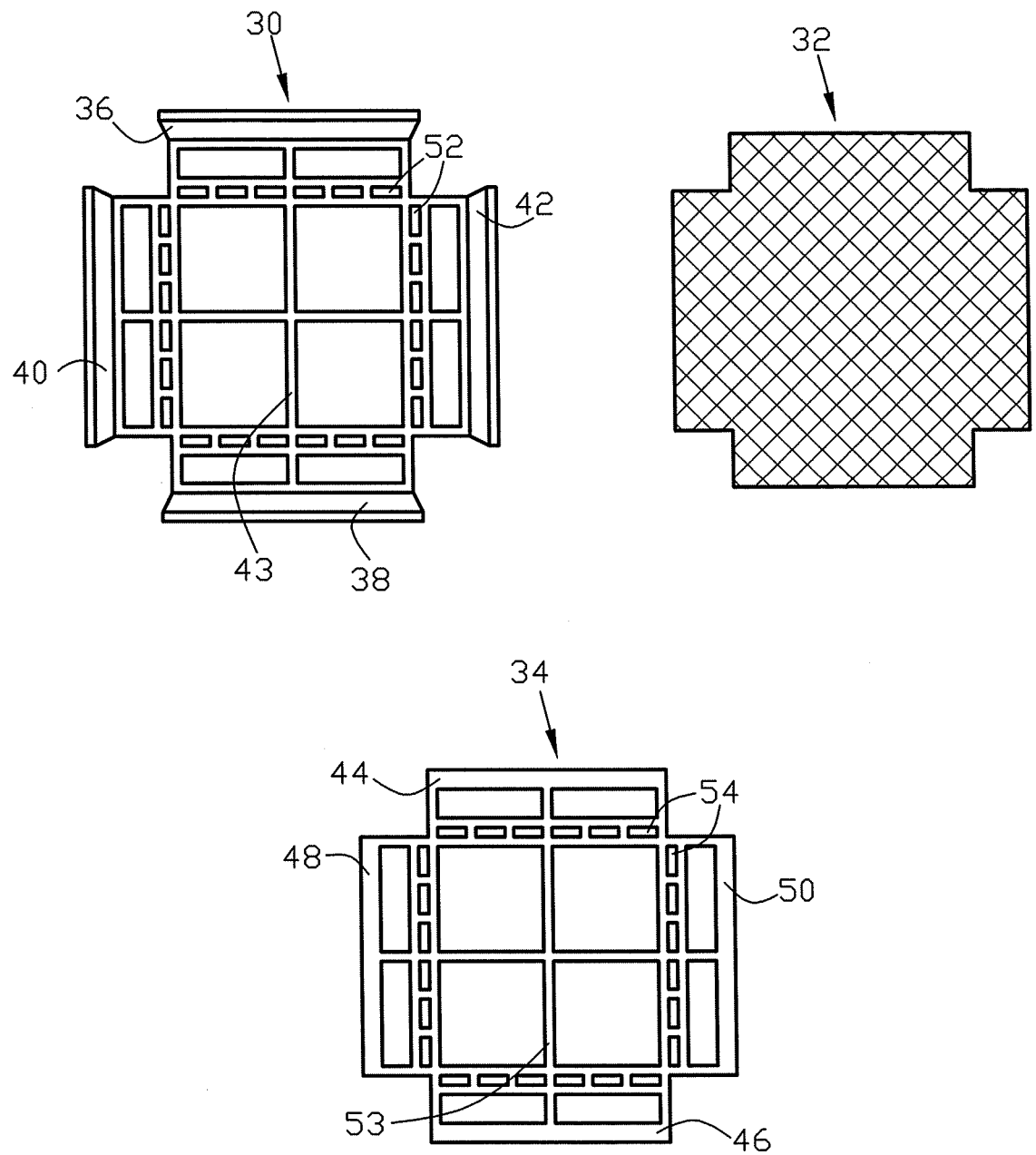
FIG. 5 is an overhead view of the components of a preferred embodiment of the present invention.
Figure 6:
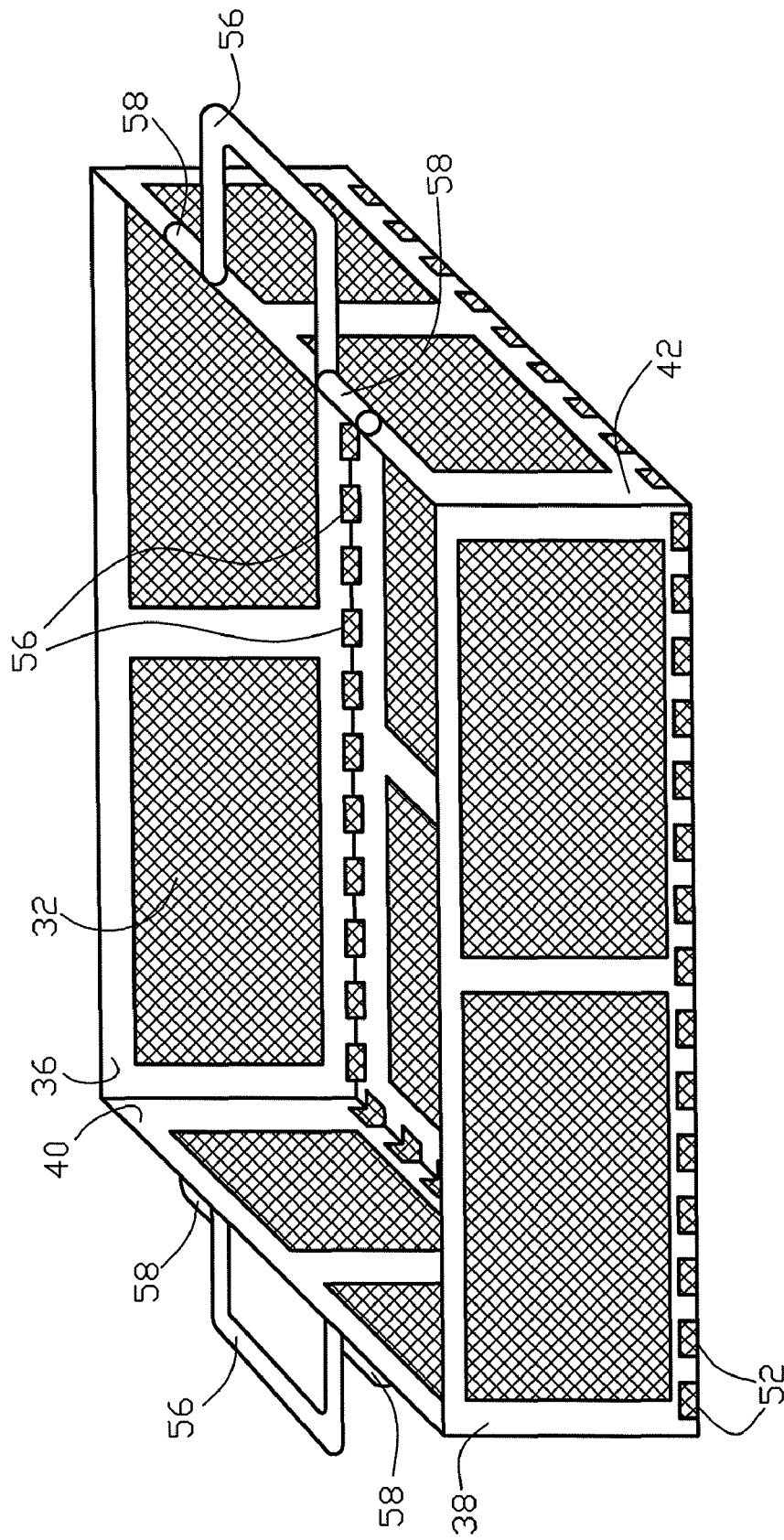
FIG. 6 is a general perspective view of a preferred embodiment of the present invention.

Reference is now made to FIG. 5 and FIG. 6, which show two views of a preferred embodiment of the present invention. With particular reference to FIG. 5, a disassembled view of the fry basket of this embodiment. The fry basket is constructed from an outer frame member 30, a precut piece of fine mesh 32 and an inner frame member 34 all preferably constructed of stainless steel. Outer frame member 30 comprises latitudinal outer frame sidewalls 36 and 38, longitudinal outer frame sidewalls 40 and 42, and open outer frame base 43. Inner frame member 34 comprises latitudinal inner frame sidewalls 44 and 46, longitudinal inner frame sidewalls 48 and 50, and open inner frame base 53. Outer frame member 30 and inner frame member 34 include a plurality of corresponding boiling slots 52 and 54 respectively. Boiling slots 52 and 54 aid in frying by allowing gases created during frying to evenly escape.

The fry basket can be assembled by placing precut piece of fine mesh 32 into outer frame member 30, then placing inner frame member 34 on top of piece of fine mesh 32, then folding corresponding sidewalls up into position as shown in FIG. 6. Alternatively, fry basket could be assembled by folding sidewalls of outer framer member 30 and inner framer member 34 up into approximate position. Then placing precut piece of fine mesh 32 into outer frame member 30 and securing inner frame member 32 so that piece of fine mesh 32 is sandwiched between outer frame member 30 and inner frame member 32. The three basket components could be secured together by any means known in the art, for example welding, screws, nuts, bolts, clips, rivets, fasteners or the like. Preferably, the basket components are secured together in a temporary fashion to allow for easy replacement of the precut piece of fine mesh 32. More preferably the three basket components are secured together by intimate contact, such that when inner framer member 34 is pushed into outer frame member 30 with precut piece of fine mesh 32 sandwiched between the two frame members, they snap together forming a secure and sturdy basket that can later be disassembled for easy replacement of precut piece of fine mesh 32

Particular, reference is now made to FIG. 6 which shows a fully constructed view of a preferred embodiment of the fry basket. Once the components shown in FIG. 5 are assembled they could look like the fry basket show in FIG. 6. The fry basket of Figure six also comprises detachable handles 56, which connect to fry basket by means of brackets 58. Although, the detachable handles could be connected by any detachable and reattachable means known in the art, not just by said brackets.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

What is claimed:

1. A basket for frying food products consisting essentially of:
   an outer frame with four outer frame sidewalls, an outer frame base, and a plurality of boiling slots;
   an inner frame with four inner frame sidewalls, an inner frame base, and a plurality of boiling slots corresponding to the outer frame boiling slots;
   at least one piece of wire mesh sandwiched between the outer frame and the inner frame to form a substantially rectangular basket having a wire mesh base and four wire mesh sidewalls; and
   one or more handles attached to the outer frame;
   wherein the outer frame and the inner frame are secured together in a temporary fashion, and
   wherein the wire mesh base and wire mesh sidewalls are constructed of wire mesh with distances of 0.0010 to 0.0450 inches between adjacent parallel wires of the wire mesh.

2. The basket of claim 1, wherein the basket is constructed of a wire mesh with distances of 0.0060 to 0.0150 inches between adjacent parallel wires of said wire mesh.

3. The basket of claim 1, wherein the basket is constructed of wire mesh with distances of 0.0060 to 0.0350 inches between adjacent parallel wires of said wire mesh.

4. The basket of claim 1, wherein the basket is constructed of stainless steel.

5. The basket of claim 1, wherein the basket is constructed of copper.

6. The basket of claim 1, wherein the one or more handles are detachable.

7. The basket of claim 1, wherein said at least one piece of wire mesh is removable.

8. The basket of claim 1, wherein said at least one piece of wire mesh is replaceable.

\* \* \* \* \*